United States Patent [19]

Gonzalez et al.

[11] Patent Number: 5,300,754
[45] Date of Patent: Apr. 5, 1994

[54] SUBMERGED ARC FLUX AND METHOD OF MAKING SAME

[75] Inventors: John Gonzalez, Willoughby; Rao N. Kudithipudi, North Royalton; Ronald F. Young, Willoughby, all of Ohio

[73] Assignee: The Lincoln Electric Company, Cleveland, Ohio

[21] Appl. No.: 725,963

[22] Filed: Jul. 5, 1991

Related U.S. Application Data

[60] Continuation-in-part of Ser. No. 608,300, Nov. 2, 1990, abandoned, which is a division of Ser. No. 405,727, Sep. 11, 1989, Pat. No. 5,003,155, and a continuation-in-part of Ser. No. 501,167, Mar. 29, 1990, Pat. No. 5,118,919, which is a continuation-in-part of Ser. No. 495,696, Mar. 19, 1990, Pat. No. 5,055,655, which is a continuation-in-part of Ser. No. 405,727, Sep. 11, 1989, Pat. No. 5,003,155.

[51] Int. Cl.$^5$ .............................................. B23K 35/368
[52] U.S. Cl. ..................................................... 219/146.3
[58] Field of Search .................... 219/73, 146.22, 146.1, 219/146.24, 145.22, 146.3, 146.52, 137 WM

[56] References Cited

U.S. PATENT DOCUMENTS

| | | | |
|---|---|---|---|
| 3,272,667 | 9/1966 | Siegle et al. | 148/23 |
| 3,318,729 | 5/1967 | Siegle | 117/202 |
| 3,392,263 | 7/1968 | Tichelaar | 219/146 |
| 3,496,322 | 2/1970 | Gonzalez | 219/73 |
| 3,539,765 | 11/1970 | Duttera | 219/146 |
| 3,769,491 | 10/1973 | DeLong | 219/137 |
| 3,796,609 | 3/1974 | Gonzalez et al. | 148/24 |
| 3,867,608 | 2/1975 | Ohwa | 219/73 |
| 3,868,487 | 2/1975 | Ito et al. | |
| 3,959,031 | 5/1976 | More | 148/26 |
| 3,999,036 | 12/1976 | Muratov | 219/145 |
| 4,029,934 | 6/1977 | Clark | 219/145 |
| 4,071,734 | 1/1978 | Zarechensky et al. | 219/146.31 |
| 4,251,711 | 2/1981 | Tanigaki | 219/146.24 |
| 4,379,811 | 4/1983 | Puschner | 428/555 |
| 4,432,937 | 2/1984 | Kuwayama | 420/513 |
| 4,443,406 | 4/1984 | Sukekawa | 420/584 |
| 4,465,921 | 8/1984 | Sakai | 219/146.24 |
| 4,675,056 | 6/1987 | Melfi et al. | 148/24 |
| 4,683,011 | 7/1987 | Weaver et al. | 148/26 |
| 4,764,224 | 8/1988 | Okuda et al. | 148/26 |
| 5,003,155 | 3/1991 | Chai et al. | 219/145.22 |

FOREIGN PATENT DOCUMENTS

| | | |
|---|---|---|
| 289357 | 11/1966 | Australia . |
| 407227 | 4/1969 | Australia . |
| 414173 | 5/1969 | Australia . |
| 423107 | 6/1969 | Australia . |
| 416808 | 12/1970 | Australia . |
| 439774 | 1/1972 | Australia . |
| 451653 | 4/1972 | Australia . |
| 484159 | 7/1975 | Australia . |
| 2796577 | 12/1979 | Australia . |
| 417546 | 8/1990 | European Pat. Off. . |
| 1190597 | 4/1965 | Fed. Rep. of Germany . |

OTHER PUBLICATIONS

"A Fluoroplastic Material in Flux–Cored Strip to Reduce the Hydrogen Content of Deposited Metal", Automatic Welding, Jan. 1985, (3 pgs.).

*Primary Examiner*—Clifford C. Shaw
*Attorney, Agent, or Firm*—Body, Vickers & Daniels

[57] ABSTRACT

A granular flux suitable for submerged arc electric welding comprising particles of composite fluxing ingredients of the agglomerated or fused type combined with a halogenated polymer as a reducing agent for diffusible hydrogen in the resulting weld metal and a method of making this granular flux wherein the polymer is mixed with the flux particles and then heated to a temperature above the melting temperature of the polymer and below the vaporization temperature of the polymer.

22 Claims, 1 Drawing Sheet

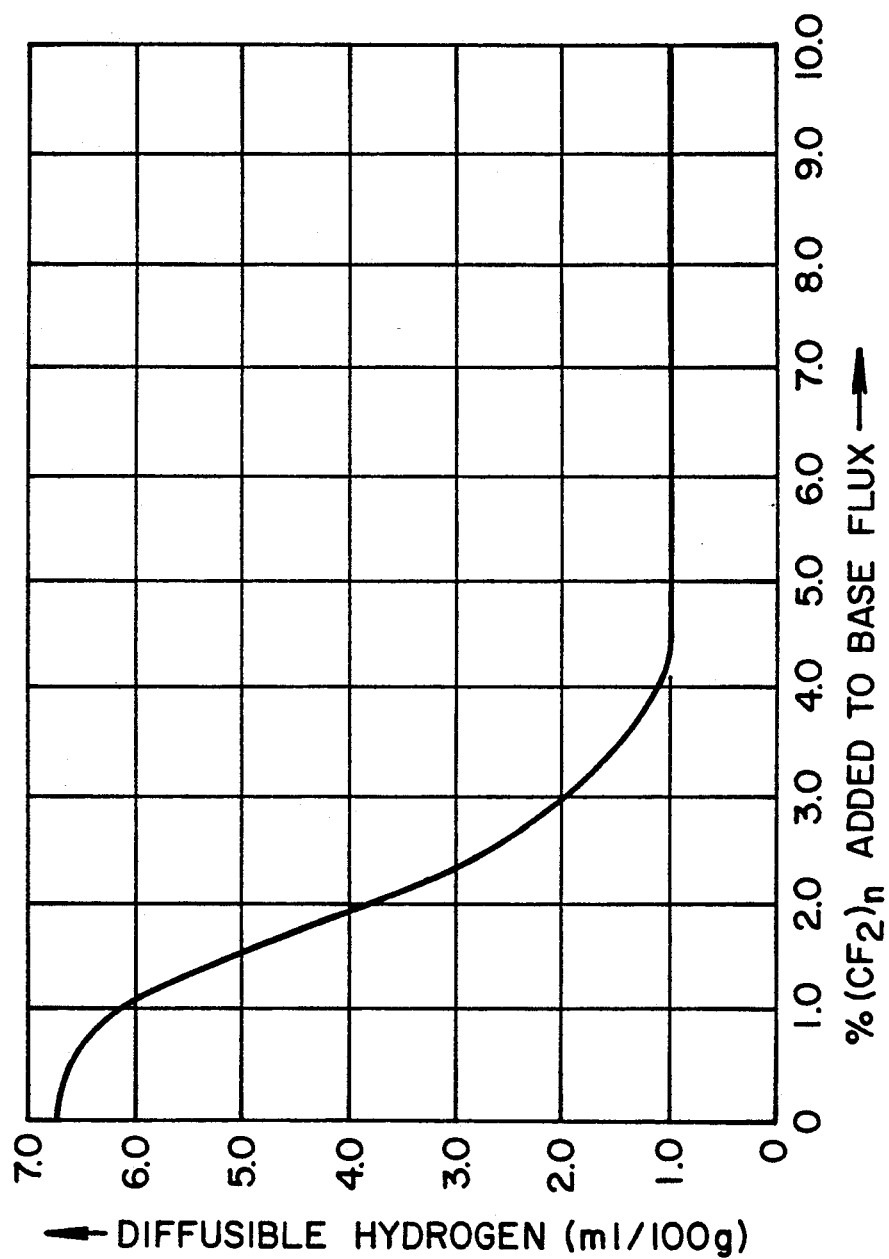

SUBMERGED ARC FLUX AND METHOD OF MAKING SAME

This application is a continuation-in-part application of prior application Ser. No. 608,300, filed Nov. 2, 1990, now abandoned which is a division of application Ser. No. 405,727, filed Sep. 11, 1989, now U.S. Pat. No. 5,003,155 and a continuation-in-part application of prior application Ser. No. 501,167, filed Mar. 29, 1990, now U.S. Pat. No. 5,118,919 which is a continuation-in-part of prior application Ser. No. 495,696, filed Mar. 19, 1990 now U.S. Pat. No. 5,055,655, which is, in turn, a continuation-in-part application of prior application Ser. No. 405,727, filed Sep. 11, 1989, now U.S. Pat. No. 5,003,155.

INCORPORATION BY REFERENCE

Prior related patent application Ser. No. 501,167 and U.S. Pate. No. 5,003,155 are incorporated by reference herein so that the disclosed matter of these copending applications need not be herein repeated, except to the extent to explain the present invention. Further, as background information, prior U.S. Pat. Nos. 3,496,322; 3,796,609; 4,675,056; and, 4,683,011 are incorporated by reference as showing agglomerated fluxes, the flux to which the preferred embodiment of this invention is directed.

BACKGROUND OF INVENTION

The present invention relates to the art of fluxes for arc welding and more particularly to a granular flux suitable for submerged arc electric welding of the type including agglomerated or fused particles containing fluxing ingredients with or without normal alloying constituents. The invention is particularly applicable for use with agglomerated fluxes used in submerged arc electric welding and it will be described with particular reference thereto; however, the invention has broader applications and may be used with fused particles of fluxing constituents, with or without alloying and other materials contained therein. This invention may also be used to advantage when applied to the fill components of cored electrodes or to the coating components of SMAW manual electrodes. It may be applied directly to the jacket and/or into the seam of cored electrodes or to the core wire of SMAW manual electrodes. The invention is further particularly applicable to the welding of high strength low alloy steels such as HY-80, HY-100 and even HY-130 and it will be described with particular reference to fluxes of the type used in welding such high strength, low alloy steels although the invention is not limited to any particular type of flux. However, the invention relates to reduction of diffusible hydrogen to levels approaching less than 5.0 ml/100 grams of deposited weld metal (hereafter "ml/100 g") and preferably less than 3.0 ml/100 g. Metals with yield strengths greater than 102,000 psi minimum yield strength must have, by specifications, less than 3.0 ml/100 g and preferably less than 2.0 ml/100 g. Such reduced level of diffusible hydrogen is a primary factor when welding high strength low alloy steels having a yield strength in excess of 80,000 lbs/in$^2$.

High strength, low alloy steels are noted for their toughness, particularly at low temperatures and have been used extensively in the fabrication of cryogenic vessels and large transportation equipment, especially railroad cars, surface ships and submarines. These vessels have plates of high strength, low alloy steels welded together to form fabricated structures. It is axiomatic that such welds must have low diffusible hydrogen to prevent hydrogen induced cracking. The present invention relates to an improvement in the normal agglomerated or fused flux used for submerged arc welding of mild steel and high strength, low alloy steels. The invention is applicable to any submerged arc welding process where reduction of said diffusible hydrogen is desired, such as welding of mild steels, especially thick plates of mild steel as done in support structures for offshore drilling platforms.

When using submerged arc welding for high strength steel, high deposition rates and high quality welding have involved the use of specific fluxes which tend to create a low level of diffusible hydrogen as measured by the standard American Welding Society hydrogen analysis test identified as AWS A4.3(1986). In the past, these fluxes have normally resulted in a diffusible hydrogen level in the weld bead of between 5.0 and 10.0 ml/100 g diffusible hydrogen. Fluxes have been formulated which attempt to decrease this diffusible hydrogen value to less than 5.0 ml/100 g; however, such fluxes in submerged arc welding have resulted in diffusible hydrogen of over 3.0 ml/100 g. This level of diffusible hydrogen may be acceptable at 80,000 psi yield strength when used with proper procedure control; however, specifications are now in place which demand substantially lower diffusible hydrogen to prevent the hydrogen induced cracking of the weld or heat affected zone (HAZ). In addition, in the higher strength steels, fabricators are demanding less than 2.0 ml/100 g of diffusible hydrogen in the resulting weld bead. These levels have been extremely difficult, if not impossible, to obtain in submerged arc welding in view of the ambient conditions under which such welding takes place and the effect of the moisture content in the air surrounding the welding operation. Consequently, there is a demand for a submerged arc welding flux which will reduce the diffusible hydrogen in the resulting weld bead to below 3.0 ml/100 g and preferably below 2.0 ml/100 g, especially when welding higher strength metal such as HY-100 and HY-130. Fluxes heretofore have not been able to accomplish this objective economically and repeatedly in various welding environments experienced when using submerged arc welding techniques.

THE INVENTION

The present invention relates to a granular flux suitable for submerged arc electric welding comprising particles of composite fluxing ingredients which may or may not include alloying and various other constituents, which flux tends to reduce the diffusible hydrogen. The new submerged arc flux can reduce the diffusible hydrogen to a value less than 3.0 ml/100 g.

In accordance with the present invention there is provided a granular flux suitable for submerged arc electric welding comprising particles of composite fluxing ingredients, with or without alloying constituents, and halogenated polymer as a reducing agent for the diffusible hydrogen in the weld metal and, more specifically, a fluorinated polymer. In practice the polymer comprises polytetrafluoroethylene and is mixed with the fluxing particles. In accordance with the preferred embodiment of the invention, the polymer is coated onto the surface of the fluxing particles by heating a mixture of fluxing particles and the polytetrafluoroethylene particles to a temperature above the melting temperature of polytetrafluoroethylene, but below its vaporization temperature. In this preferred method for combining the fluorinated polymer with the fluxing particles, referred to as sintering, the fluorinated polymer is melted and coated onto the surfaces of the fluxing particles. Consequently, when the flux is reused, the fluorinated polymer remains with the fluxing particles. If the polymer is not sintered onto the flux particles, the polymer powder may separate from the flux particles, especially during use; however, the advantages of the polymer in reducing hydrogen is still accomplished.

In accordance with the preferred embodiment of the invention, fluxing ingredients are mixed with a standard binder, such as sodium silicate and/or potassium silicate. This mixture is then heated until the silicate or silicates are hardened and bind the various fluxing ingredients into relatively large chunks of material. The chunks are then ground to the desired size to produce the agglomerated flux particles bound together with the insoluble silicates. These particles are then combined with the fluorinated polymer in accordance with the present invention by either mixing the particles or mixing the particles and then heating the particles to coat the surfaces of the flux particles with the polymer. To produce fused type flux, the fluxing ingredients may be finely ground, mixed together and heated to a temperature above the melting temperature of the constituents after which the material is allowed to cool and harden. Then, the hardened mass is ground to the desired granular size. These granular particles are mixed with the polymer to produce the submerged arc granular flux of the present invention. The polymer is preferably coated onto the surfaces of the flux particles to prevent separation.

In accordance with another aspect of the present invention, the fluorinated polymer is combined with the fluxing particles in an amount providing 0.10-5.0% by weight of the flux being the polymer. Preferably, this range is 0.5-3.5% by weight of the flux. As the percentage of polymer in the flux increases, the amount of diffusible hydrogen decreases. In practice after reaching a level of about 1.0 ml/100 g there is no measurable further decrease in hydrogen. In accordance with the preferred embodiment of the invention, the fluxing particles with which the polymer is combined include standard fluxing ingredients used for welding mild steel when lower diffusible hydrogen is required and high strength, low alloy steels, such as HY-80 through HY-130 steels, which fluxing constituents, in the preferred embodiment include magnesium oxide in the range of 25.0-37.0% by weight; aluminum oxide 10.0-20.0% by weight and calcium fluoride 20.0-32.0% by weight. With these basic ingredients, there are normally provided sodium oxide, potassium oxide, calcium oxide, silicon dioxide and manganese oxide to produce the desired fluxing system for the submerged arc welding operation. Of course, appropriate deoxidizers and alloying constituents could be included in the fluxing ingredient particles. The ingredient particles can be formed by various materials which are employed in both agglomerated and fused flux for submerged arc welding. The invention does not relate to the formation of the fluxing particles, but to the use of such particles in combination with a halogenated polymer such as a fluorinated polymer for the purpose of reducing the diffusible hydrogen to a low level below 3 ml/100 g in welding of high strength, low alloy steels. In addition, these low levels of hydrogen can be obtained with a substantial amount of moisture in the air surrounding the welding operation.

In accordance with another aspect of the present invention, there is provided a method of making a granular flux suitable for submerged arc electric welding, which method comprises the steps of forming fluxing particles of composite fluxing ingredients and mixing particles of fluorinated polymers with the fluxing particles.

Another aspect of the invention involves the step of heating the mixture of fluxing particles and polymer powder particles to a temperature above the melting temperature of the polymer and below the vaporization temperature of the polymer for a sufficient amount of time to coat the polymers onto the fluxing particles. This method provides a substantial improvement in the broad aspect of the invention, since the fluorinated polymer remains with the fluxing particles even during recycling of the granular, submerged arc flux.

In accordance with another aspect of the present invention, the fluxing particles are formed by the agglomeration process wherein the fluxing ingredients in powdered form are mixed with a standard binder and heated into an agglomerated material. The resulting material is then pulverized to convert the agglomerated material into fluxing particles. In practice of the invention, the polymer particles have a size in the range of 0.10-30 microns, i.e. less than 30 microns. The flux particles are screened to the desired size. The polymer is 3% of the dry mixture which is heated to fuse the polymer to the base flux.

It is a primary object of the present invention to provide a granular flux suitable for submerged arc electric welding, which flux reduces the amount of diffusible hydrogen in the resulting weld bead or weldment and can be used with either an agglomerated flux or a fused submerged arc flux.

Still a further object of the present invention is the provision of a method for forming the granular submerged arc flux as defined above, which method is economical and results in a flux which reduces the diffusible hydrogen to reduce the hydrogen induced cracking tendency of mild steel and of high strength, low alloy steels.

Still a further object of the present invention is the provision of a flux and method as defined above, which flux reduces the amount of diffusible hydrogen in high strength, low alloy steels to a level below 3.0 ml/100 g and preferably below 2.0 ml/100 g.

Still a further object of the present invention is the provision of a submerged arc flux and a method of making the same, which flux results in high impact strength and low cracking tendency for high strength steels. The invention can be used in either agglomerated or fused fluxes for submerged arc welding.

The overall and primary object of the present invention is the provision of a granular submerged arc flux which will reduce the diffusible hydrogen in the weld metal and method of making this flux.

A further object of the invention is the provision of a flux, as defined above, which flux can be used in high strength steel welding applications such as HY-80, HY-100 and HY-130 steels, where hydrogen cracking is more prevalent and must be eliminated by reducing the diffusible hydrogen to very low levels.

THE DRAWING

The single figure is a graph illustrating the effect of increased fluorinated polymer percentages in a submerged arc flux on the amount of diffusible hydrogen in the weld metal.

PREFERRED EMBODIMENTS

The current trend in the steel fabricating industry is to use high strength steels to reduce plate thickness. Because the higher strength steels are more prone to hydrogen embrittlement, very low diffusible hydrogen in the weld metal is a requirement. Low hydrogen is becoming more critical in industry regardless of the welding process being used and the steel being welded. At any given strength of the plate, the tendency for hydrogen induced cracking is greater as the level of the diffusible hydrogen increases. At a particular level of diffusible hydrogen, there is a greater tendency for hydrogen embrittlement as the strength of the steel is increased. Consequently, reduction in diffusible hydrogen for submerged arc welding is necessary and becomes more imperative as the strength of the steel increases. This is true even as the plate thickness and structural design, ambient conditions, welding parameters, such as preheating temperatures, and post welding processing is used for reducing the cracking tendency. The use of a halogenated, i.e. fluorinated polymer, such as polytetrafluoroethylene for either agglomerated or fused submerged arc flux has been found to reduce the diffusible hydrogen in the resulting weld metal. The polymer can be either mixed with the granular flux or, preferably, fused or sintered with the individual particles or granules in the flux for better storage, shipment, use, and recycling of the flux.

The fluorinated polymer is added to a basic neutral flux which has the following composition:

| BASE FLUX | |
|---|---|
| Constituent | % By Weight |
| $Na_2O$ | 0.5–2.0 |
| MgO | 25.0–37.0 |
| $Al_2O_3$ | 10.0–20.0 |
| $K_2O$ | .5–2.0 |
| CaO | 3.0–10.0 |
| $MnO_x$ | 5.0 Max |
| $CaF_2$ | 20.0–32.0 |
| $SiO_2$ | 5.0–20.0 |

The base flux is a standard submerged arc agglomerated flux which is formed with an appropriate binder in accordance with standard agglomerated flux techniques. The invention can be used with various fluxes, i.e. basic, acidic and neutral. The base is commonly employed for submerged arc welding of high strength, low alloy steel plates. The diffusible hydrogen when using this flux is normally between 3–5 ml/100 g and is primarily dependent upon the amount of moisture in the flux and the moisture in the dry air surrounding the welding operation. Of the constituents set forth in the base flux, magnesium oxide, aluminum oxide and calcium fluoride are the primary elements. The other materials are used in the preferred embodiment. Various modifications of the primary constituents and the remaining constituents can be made, since the invention relates to the concept of adding a fluorinated polymer to the fluxing particles for reducing the amount of diffusible hydrogen in the resulting weld.

An example of the inventive flux is set forth below:

| EXAMPLE | |
|---|---|
| Constituent | % By Weight |
| MgO | 25.0–37.0 |
| $Al_2O_3$ | 10.0–20.0 |
| $CaF_2$ | 20.0–32.0 |
| $(CF_2)_n$ | 0.10–3.0 |
| Slag components, alloys and binder | Remainder |

The Example was prepared with various percentages of fluorinated polymers to obtain the results set forth in Table I.

TABLE I

| Flux | Diffusible Hydrogen AWS A4.3(86)* |
|---|---|
| Base + 0.5% $(CF_2)_n$ | 2.0–1.7 ml/100 g |
| Base + 1.0% $(CF_2)_n$ | 1.7–1.4 ml/100 g |
| Base + 2.0% $(CF_2)_n$ | 1.1–0.9 ml/100 g |

*At 20 grains of moisture per pound of dry air

The diffusible hydrogen was drastically reduced below the hydrogen levels of at least about 5.0 ml/100 g using the base flux. 0.5–2.0% polymer particles were mixed with the flux particles after the flux particles were formed in accordance with standard practice. The diffusible hydrogen was within the restricted specification of no more than 2.0 ml/100 g. Table I indicates that the polymer particles reduce the diffusible hydrogen. To verify this observation, additional tests were conducted and are reported in Table II.

TABLE II

| Flux | Diffusible Hydrogen AWS A4.3(86)* |
|---|---|
| Base + 1.5% $(CF_2)_n$ | 1.26 ml/100 g |
| Commercial Base Type Flux | 5.10 ml/100 g |

*At 22 grains of moisture per pound of dry air

By including 1.5% of polytetrafluoroethylene particles, with a size in the general range of 0.10–30 microns, into the base flux and without any other modifications, the diffusible hydrogen was reduced to 1.26 ml/100 g. This test verified the results shown in Table I, i.e. the addition of fluorinated polymer results in lower diffusible hydrogen in the weld metal.

Table II illustrates a test conducted with a standard agglomerated flux of the type used for high strength, low alloy steels and sold in competition with the tested base flux. This commercial flux resulted in 5.10 ml/100 g of diffusible hydrogen in the weld metal. This level of hydrogen is somewhat similar to the hydrogen resulting from tests with the base flux without the polymer.

The several tests verify the advantages and improvements resulting from use of the present invention. With the examples set forth above, the polytetrafluoroethylene particles mixed with the standard flux particles were found to have a tendency to separate during shipment, handling, welding and recycling. Consequently, the polymer powder is now incorporated into a flux by heating the mixture of flux particles and polymer particles to a temperature above its melting point and below its vaporization temperature. Thus, the mixture is mixed and heated either in a batch operation or a continuous operation at a temperature above the melting temperature of the fluorinated polymer and below the vaporization temperature of the polymer. This heating process coats the polymer onto the fluxing particles so that subsequent shipping, handling, welding and recycling do not cause separation of the polymer from the surfaces of the granulated flux particles.

A test showing this heating procedure used to coat the polymer onto the fluxing particles is set forth in Table III and is identified as "sintered". This method produced a flux that obtained a diffusible hydrogen level of 2.13 ml/100 g, whereas the fluxes with particles of polytetrafluoroethylene that were merely mixed with the fluxing particles resulted in a hydrogen level of 1.90 ml/100 g.

TABLE III

| Flux | Diffusible Hydrogen AWS A4.3(86)* |
|---|---|
| Base Flux | 4.98 ml/100 g |
| Base Flux + 2% $(CF_2)_n$ Blended Mixture | 1.90 ml/100 g |
| Base Flux + 2% $(CF_2)_n$ Sintered Mixture | 2.13 ml/100 g |

Table III shows the effect of sintering the polymer onto the flux particles. Dry blending 2% of the polymer with the flux particles results in a diffusible hydrogen of 1.90 ml/100 g. Sintering the same mixture results in a diffusible hydrogen of 2.13 ml/100 g.

These results are generally the same and show that the polymer can be coated onto the particles of the flux for improving the physical characteristics of the resulting granular flux for submerged arc welding without changing the effectiveness of the polymer particles to a noticeable extent. The invention can be used with other slag systems of different submerged arc fluxes, such as fluxes for general fabricating, hardfacing and pipe welding.

Submerged arc welding generally results in 5-10 ml/100 g in the weld metal even when using fluxes designed to reduce the diffusible hydrogen. The amount of hydrogen changes with the moisture in the surrounding air. By using highly basic flux the obtainable diffusible hydrogen for submerged arc is typically about 5 ml/100 g. This basic flux has a basicity index of about 3. Thus there is low weld metal oxygen which promotes higher impact strength. Thus, the present invention relates to the use of a highly basic flux that reduces oxygen, together with polytetrafluoroethylene particles to further reduce the diffusible hydrogen in the weld metal. By using the sintering or heating method, the resulting flux is more stable in a physical sense and the polymer remains with the flux particles in the desired distribution scheme. The polymer does not separate from the flux particles. In accordance with the invention, the polymer is added in the range of about 0.10-5.0% by weight of the flux. The flux can be either agglomerated in accordance with standard practice or fused in accordance with standard practice.

The new granular flux, which is preferably a highly basic flux, is made by forming flux particles of composite flux ingredients. These fluxing particles may include alloys or other elements. Finely ground particles of fluorinated polymers are mixed with the fluxing particles. In practice the size of these particles is 0.10-30 microns; however, any size to allow adequate mixing can be used. This mixture is a flux which will reduce the amount of diffusible hydrogen. In accordance with another aspect of the invention, the mixture is heated to a temperature above the melting temperature of the polymer and below the vaporization temperature of the polymer to allow the polymer to adhere on the surfaces of the particles forming the base flux. In the preferred embodiment, the base flux particles are produced in accordance with standard agglomerated flux techniques including mixing the fluxing ingredients in powdered form with a binder such as sodium silicate and/or potassium silicate, heating the powdered ingredients into an agglomerated material and then pulverizing the agglomerated material into the fluxing particles in which are mixed the polytetrafluoroethylene particles. In the preferred embodiment, the base flux is heated to a temperature to obtain the desired properties of low moisture in the resulting flux.

Ambient conditions can affect the diffusible hydrogen level of welds made with the submerged arc welding process as well as with other welding processes. To test the effect of ambient conditions on a flux containing a polymer, data was accumulated on days with significantly different ambient conditions. The flux used contained 3% polymer in the sintered condition. The relative humidity varied from 35-62%. The diffusible hydrogen varied between 1.53 ml/100 g and 2.40 ml/100 g in direct relationship to the humidity. The results indicate that the moisture level of the air during welding had a minimal effect on the resultant diffusible hydrogen level. Tests with fluxes containing no polymer had deviations of from 5 to 10 ml of hydrogen per 100 grams of weld metal for the same relative changes in ambient conditions. Thus, the improvement using the present invention is substantial. Due to economics, about 5% of polymer is the maximum employed. Beyond this amount, as shown in the figure, little detectable hydrogen reduction is measured. However, the invention can not be avoided by merely adding greater volume of the relatively expensive polymer powder, Such additions obtain the same results in the same way as the invention.

Having thus defined the invention, the following is claimed:

1. A self shielding granular flux for arc welding of high strength steel comprising halogenated polymer and particles of composites flux ingredients having a high basicity, said polymer added as a hydrogen reducing agent to maintain the diffusible hydrogen within the weld bead to less than 3.0 ml/100 g, said polymer having a particle size of 0.1-30 microns and consisting of 0.1-5.0 weight percent of the granular flux, and said high basicity flux comprising by weight percent of said granular flux:

| | |
|---|---|
| MgO | 25-37% |
| $Al_2O_3$ | 10-20% |
| $CaF_2$ | 20-32% |

2. A flux as defined in claim 1 wherein said polymer is in the general range of 0.5-3.5% by weight of said flux.

3. A flux as defined in claim 1 wherein said composite fluxing particles are agglomerations of said fluxing ingredients.

4. A flux as defined in claim 1 wherein said composite fluxing particles are fused masses of said fluxing ingredients.

5. A flux as defined in claim 1 wherein said polymer comprises a coating of polytetrafluoroethylene on said fluxing particles.

6. A flux as defined in claim 1 wherein said composite particles of MgO, $Al_2O_3$, CaO and $CaF_2$ are powders agglomerated with a binder.

7. A flux as defined in claim 1 wherein said binder is sodium silicate.

8. A flux as defined in claim 1 wherein said composite particles of MgO, Al$_2$O$_3$, CaO and CaF$_2$ are fused particles.

9. A flux as defined in claim 1, wherein said composite particles comprise:

| | |
|---|---|
| Na$_2$O | 0.5–2.0% by weight |
| MgO | 25.0–37.0% by weight |
| Al$_2$O$_3$ | 10.0–20.0% by weight |
| K$_2$O | 0.5–2.0% by weight |
| CaO | 3.0–10.0% by weight |
| MnO$_x$ | up to 5.0% by weight |
| CaF$_2$ | 20.0–32.0% by weight |
| SiO$_2$ | 5.0–20.0% by weight |
| Halogenated Polymer | up to 5.0% by weight |

10. A flux as defined in claim 9, wherein said composite particles are agglomerated with a binder.

11. A flux as defined in claim 9, wherein said halogenated polymer is a fluorinated polymer.

12. A flux as defined in claim 1, wherein said high basicity flux includes by weight percent of said granular flux:

| | |
|---|---|
| Na$_2$O | 0.5–2.0% |
| K$_2$O | 0.5–2.0% |
| CaO | 3.0–10% |
| MnO$_x$ | ≦0.5% |
| SiO$_2$ | 5.0–20.0%. |

13. A flux as defined in claim 1 wherein said flux includes deoxidizers and alloying constituents.

14. A flux as defined in claim 1 wherein this relative humidity of said flux is less than about 62%.

15. A method of making a self-shielding granular flux and limiting the diffusible hydrogen within the weld bead to less than 3.0 ml/100 g, said method comprising:
   (a) forming fluxing particles of composite fluxing ingredients having a high basicity;
   (b) mixing 0.1 –30.0 micro particles of halogenated polymers with said fluxing particles in powdered form with a binder;
   (c) heating said powdered ingredients into an agglomerated material;
   (d) pulverizing said agglomerated material into said granular flux.

16. A method as defined in claim 15 including the step of reducing the relative humidity of said agglomerated material to less than about 62%.

17. A method as defined in claim 15, wherein said halogenated polymers consists of 0.1–5.0 by weight of said granular flux and said fluxing particles comprise by weight percent of said granular flux:

| | |
|---|---|
| MgO$_x$ | 25–37% |
| Al$_2$O$_3$ | 10–20% |
| CaF$_2$ | 20–32%. |

18. A method as defined in claim 17, whereas said flux particles include by weight percent of said granular flux:

| | |
|---|---|
| Na$_2$O | 0.5–2.0% |
| K$_2$O | 0.5%–2.0% |
| CaO | 3.0–10.0% |
| MNO$_x$ | ≦5.0 |
| SIO$_2$ | 5.0%–2.0%. |

19. A method as defined in claim 18, wherein deoxidizers and alloying agents are mixed with said halogenated polymers and said fluxing particles.

20. A method of making a self-shielding granular flux suitable for arc welding high strength steel and limiting the diffusible hydrogen within the weld bead to less than 3.0 ml/100 g, said method comprising:
   (a) forming fluxing particles of composite fluxing ingredients having a high basicity;
   (b) mixing halogenated polymers with said fluxing particles;
   (c) heating said mixtures to a temperature above the melting temperature of said polymer and below the vaporization temperature of said polymer;
   (d) coating said polymer onto the surface of said fluxing particles; and
   (e) maintaining the humidity content of said coated fluxing particles to less than about 62%.

21. A method, as defined in claim 20, where said polymer consists of 0.1–5.0 weight percent of said granular flux, and said flux particles comprising by weight percent of said granular flux:

| | |
|---|---|
| MgO | 25–37% |
| Al$_2$O$_3$ | 10–20% |
| CaF$_2$ | 20–32%. |

22. A method as defined in claim 21, wherein said flux particles include by weight percent:

| | |
|---|---|
| Na$_2$O | 0.5–2.0% |
| K$_2$O | 0.5%–2.0% |
| CaO | 3.0–10.0% |
| MnO$_x$ | ≦5.0 |
| SiO$_2$ | 5.0%–2.0%. |

* * * * *